Figure 1:
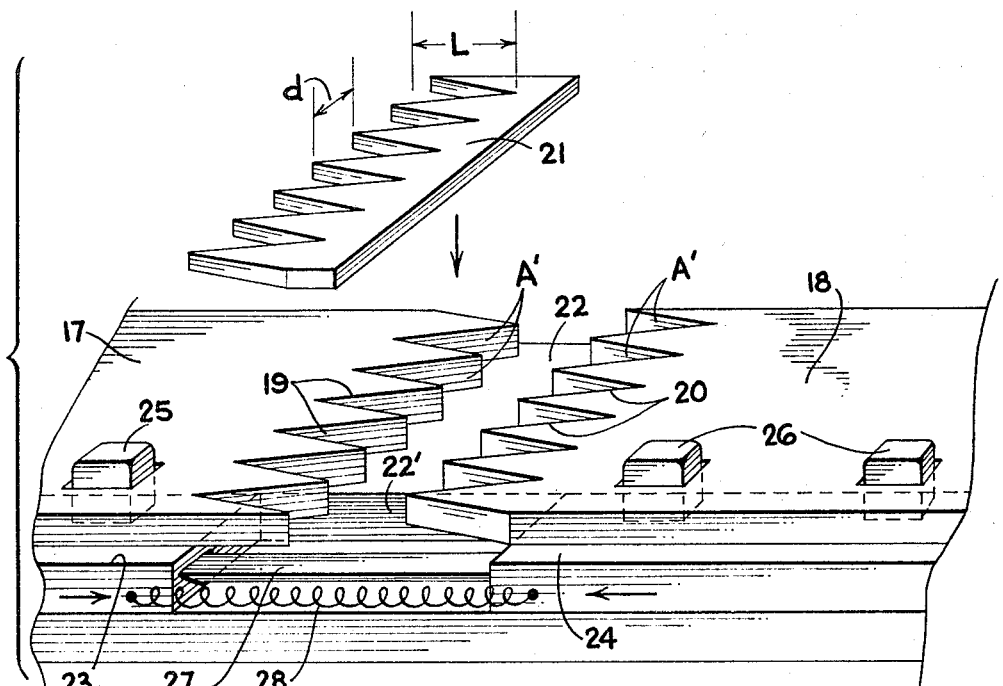

Nov. 1, 1966  O. R. NEMETH  3,282,759

METHOD AND APPARATUS FOR SPLICING FILM

Original Filed March 5, 1962

INVENTOR.
OTTO R. NEMETH
BY Elliott & Pastoriza
ATTORNEYS

United States Patent Office 3,282,759
Patented Nov. 1, 1966

3,282,759
METHOD AND APPARATUS FOR SPLICING FILM
Otto R. Nemeth, 11907 San Vicente Blvd.,
Los Angeles, Calif.
Continuation of application Ser. No. 177,286, Mar. 5, 1962. This application Feb. 14, 1966, Ser. No. 539,238
2 Claims. (Cl. 156—157)

This application is a continuation application of my co-pending application Serial No. 177,286, filed March 5, 1962, and entitled "Method and Apparatus for Splicing Film," now abandoned.

This invention relates to a novel method and apparatus for splicing film, tape, or equivalent material.

Film or tape is conventionally spliced by cutting the two film ends to be connected together in straight transverse directions generally at right angles to the longitudinal axis of the film. A small length of film emulsion is then scraped from one of the ends and the other end then positioned to overlap the one end. Suitable adhesive is applied to the scraped or cleaned end and the overlapped portions pressed together and held in position until the adhesive has set.

Another system for splicing film constitutes cutting straight transverse edges on the two ends to be secured together and abutting the same with the film held in coplanar relationship. A suitable splicing material such as a small portion of tape or the like is then caused to overlap both abutting ends to secure the same together.

In both of the foregoing film splicing operations, there results an increased thickness of the film at the point of splice. As a consequence, the film is somewhat less flexible because of the double layer involved. Therefore, when the film is caused to execute relatively short turns of small radius of curvature such as when formed into the conventional loops between a projector pull-down structure and sprocket wheel, it exhibits a discontinuity rather than a smooth curve. This discontinuous portion may weaken the splice and oftentimes will result in breaking of the film immediately adjacent the overlapping portions.

A double thickness of film at a splice point may be avoided by forming a butt splice. However, when attempting to butt the straight transverse edges of two film ends to be spliced together, there is provided very little cross-sectional area for the adhesive or other holding material to gain a proper hold on the film. Therefore, such direct butt splices have usually been unsuccessful.

With the foregoing in mind, it is a primary object of this invention to provide a greatly improved method and apparatus for splicing film or tape in which the foregoing disadvantages are overcome.

More particularly, it is an object to provide an improved method and apparatus for splicing film in which double or greater thicknesses are avoided at the point of splice to the end that when a film is caused to execute short radii of curvature turns, there is not any appreciable discontinuity in the film itself so that no weak points can thus develop which might result in breaking of the film.

Briefly, these and other objects and advantages of this invention are attained by cutting or otherwise forming the two film ends to be spliced together in a manner to deviate from the conventional straight transverse end edge so that a greatly increased effective cross-sectional holding area is provided. By this arrangement, the two ends may be pressed together in abutting relationship and yet a sufficiently large holding area is available to insure a strong splice.

A preferred apparatus for carrying out the foregoing operation comprises suitable means for forming a cut in the ends of the film which may take the form of an in and out path such as a sawtooth. Suitable means are then provided for positioning the two ends of the film in opposing relationship and biasing or otherwise urging the same together. In addition, a feature of the apparatus resides in the provision of upper and lower platens for confining adhesive or other material placed between the opposing ends so that there is assurance that the entire exposed butt end areas are wetted with the adhesive and take part in securing the ends together. Moreover, the upper and lower platens prevent the overall thickness of the film from being increased any appreciable extent by the adhesive itself.

Figure 2:
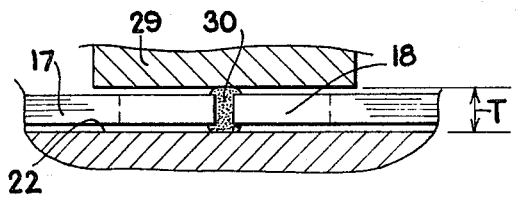

A better understanding of the method and apparatus will be had by referring to the accompanying drawing, in which:

FIGURE 1 is an exploded schematic illustration of one type of apparatus useful in effecting a splice in accordance with the present invention; and FIGURE 2 is a side elevational view illustrating certain components of the apparatus not shown in FIGURE 1.

Referring to FIGURE 1, there is illustrated the method and apparatus of the instant invention. As shown, there are provided film ends 17 and 18 each provided with end cuts 19 and 20 which differ from a straight transverse cut in that the path defined by the cut alternates inwardly and outwardly of the film. In the particular embodiment illustrated in FIGURE 1, this path is in the shape of a sawtooth.

The type of cut as shown can be achieved by a cutting blade such as indicated in the exploded portion at 21. If this blade is brought down in the direction of the vertical arrow, it may sever the end of the film 17 to cause a sawtooth pattern as shown. The same cutting knife 21 may then be turned in its plane to face in the opposite direction and effect an identical cut in the film end 18.

Since the second cut in the film end 18 is effected by the same cutting mechanism 21 after the same has been rotated 180°, when this latter cut is positioned in opposing relationship to the cut end of film 17, the two groups of sawteeth or cut portions will mate perfectly. In other words, if one film is turned over 180°, the film ends define perfect mirror images.

The actual mechanism for lowering the cutting member 21 may take any suitable form but is not illustrated to avoid obscuring the drawings. The blade 21 could be operated manually if desired. In addition, it should be understood that a cutting member having sawteeth to provide the cuts 20 in the film end 18 may be provided on the straight edge rear portion of the blade 21 so that only a single motion is necessary to effect simultaneous cutting and thus properly condition the butt ends of the film.

As shown in FIGURE 1, the film end 17 and film end 18 are positioned on a lower platen 22. This platen is of somewhat less width than the film to leave a marginal longitudinal edge 22'. This edge 22' serves in part as a guide for a pair of sprocket supporting members 23 and 24 supporting sprocket teeth 25 and 26, respectively. These sprocket teeth are arranged to pass through suitable sprocket holes in the film ends 17 and 18 as shown. A stationarily secured dove-tailed slide member 27 may be provided as a guide over which the members 23 and 24 may slide. A simple biasing means in the form of a spring 28 is shown connected between the members 23 and 24 to urge the same towards each other.

With the foregoing arrangement, it will be evident that the film ends 17 and 18 can slide over the lower platen 22 to move towards each other.

With particular reference to the cutting blade 21, the preferred embodiment of the invention provides seven and one-half sawteeth for each abutting end of the film ends 17 and 18. The extreme pointed ends of the sawteeth are separated by a distance "d" and the length or depth of the sawteeth are as indicated by the letter "L." With this arrangement, the effective exposed butt end area "A" of each of the film ends is increased by at least a factor of 2 over that which results from a straight transverse cut.

In FIGURE 2, there is shown an upper platen 29 arranged to be lowered to a distance T from the lower platen 22. This distance corresponds substantially to the thickness of the film itself and serves to confine adhesive material 30 disposed between the opposing surfaces.

In effecting a splice in accordance with the method and apparatus of the invention, the film ends are first cut by the cutting mechanism 21 illustrated in FIGURE 1. These ends are then held apart against the bias of the spring 28 and suitable adhesive material disposed therebetween. The upper platen 30 is then lowered as illustrated in FIGURE 2 to confine the adhesive to the space between the opposing film ends. The slide members 23 and 24 and thus the sprocket teeth 25 and 26 are then released so that the same are urged together to in turn urge the film ends 17 and 18 together so that the various exposed butt end areas will mate. The two film ends are then held in their mated position until the adhesive 30 has dried.

Since the adhesive has been substantially confined by the upper and lower platens 29 and 22, there is no substantial increase in the overall thickness of the film at the point of splice. Further, since a greatly increased area has been provided to which the adhesive may adhere, the splice is sufficiently strong so that the film can execute short radiused turns without breaking and without exhibiting any discontinuities so that the problems encountered with prior art splices are avoided.

While only one particular embodiment of the invention has been set forth and described, the entire method and apparatus of this invention are not to be thought of as limited to such embodiment. Thus, while "film" has been illustrated, this term is herein defined to include tape or equivalent material. Also, it will be appreciated that the sawtooth configuration, although preferred, is only exemplary of the type of splice embodied in the present invention. It is desirable, however, that all mating portions of the abutting film ends be angled with respect to the longitudinal axis of the film in order to obtain maximum squeezing of the adhesive therebetween.

It is also essential that the longitudinal length of the teeth or equivalent tapered members be such as to create sufficient resisting leverage to the tendency towards discontinuity as the result of film movement about paths of small radius. Furthermore, as heretofore mentioned, it is necessary that the total area of service or abutting area be sufficient to at least equal in strength the non-spliced film.

What is claimed is:

1. A method of splicing two film ends together, comprising the steps of: changing the butt end of each of said film ends from a straight transverse end to an end extending in straight lines alternately inwardly and outwardly a plurality of times to increase the total butt end area of each end by a factor greater than 2, said ends being mirror images of each other when one film end is turned over 180° and is in opposing relationship to the other film end; inserting adhesive between the increased butt end areas of said two film ends; urging the increased butt end areas of said two film ends together into pressing engagement without overlapping of any portion of said butt end areas; confining the upper and lower surfaces of the two films adjacent to their ends when pressing the ends together to limit the escape of said adhesive from between the ends; and holding said butt end areas in pressing engagement until said adhesive has set, the increased area of bonding by said adhesive being such as to provide a strength for said splice at least equal to the strength of an unspliced portion of the film.

2. A film splice apparatus comprising, in combination: means defining a cutting edge for cutting one end of two films to be spliced together in a path alternately extending in straight lines inwardly and outwardly a plurality of times to increase the butt end area of said one film end over the area resulting from a straight right angle transverse cut by a factor greater than 2, rotation of said cutting edge 180° positioning the same for cutting the other film end in a similar manner so that said film ends are mirror images of each other when one film is turned over 180°; means for positioning said two film ends in opposing co-planar relationship, said means including at least one movable slide member having sprocket teeth for engaging the end portion of one of said film ends and another member having sprocket teeth for engaging the end portion of the other of said film ends; biasing means connected to said one member for biasing said one member towards said another member to bring the butt end areas of said film ends into mating engagement for bonding by an adhesive without any overlapping of any portions of said butt end areas; and upper and lower platens separated by a distance corresponding substantially to the thickness of said film and positioned above and below said film ends respectively to confine adhesive material substantially to the space between the butt ends of said two film ends, the bonding area of said butt ends being sufficient to provide strength in the resulting splice at least equal to the strength of an unspliced portion of the film.

No references cited.

EARL M. BERGERT, *Primary Examiner.*

D. J. DRUMMOND, *Assistant Examiner.*